United States Patent

Hirai

(10) Patent No.: US 6,642,292 B2
(45) Date of Patent: Nov. 4, 2003

(54) RESIN COMPOSITION FOR SLIDING MEMBER AND SLIDING MEMBER USING THE SAME

(75) Inventor: Kazuo Hirai, Kamakura (JP)

(73) Assignee: Oiles Corporation, Tokyo (JP)

( * ) Notice: Subject to any disclaimer, the term of this patent is extended or adjusted under 35 U.S.C. 154(b) by 190 days.

(21) Appl. No.: 09/907,448

(22) Filed: Jul. 18, 2001

(65) Prior Publication Data

US 2002/0032261 A1 Mar. 14, 2002

(30) Foreign Application Priority Data

Jul. 28, 2000 (JP) ........................................ 2000-228208

(51) Int. Cl.⁷ ............................. C08K 3/24; C08K 5/01; C08K 91/00; C08K 5/095
(52) U.S. Cl. ........................... 524/322; 524/9; 524/300; 524/394; 524/399; 524/400; 524/417; 524/474
(58) Field of Search ........................... 524/9, 417, 300, 524/322, 394, 399, 400, 474

(56) References Cited

U.S. PATENT DOCUMENTS 5,156,756 A 10/1992 Kojima et al. ................. 252/11

FOREIGN PATENT DOCUMENTS

| EP | 0 146 140 | 6/1985 |
|---|---|---|
| EP | 0 340 931 | 11/1989 |
| EP | 0 431 594 A1 | 6/1991 |
| EP | 0 747 444 A1 | 11/1996 |
| EP | 1 097 967 A2 | 5/2001 |
| GB | 1 237 591 | 6/1971 |
| JP | 55 028562 | 2/1980 |
| JP | 55 157660 | 12/1980 |
| JP | 62 045662 | 2/1987 |
| JP | 01 170691 | 7/1989 |

OTHER PUBLICATIONS

Chemical Abstracts Service Nagao et al "Lubricating greases for pipe fitting" Accession No. 107:10253 XXP002176388 abstract JP 62 084188A k4/1987.

*Primary Examiner*—Peter Szekely
(74) *Attorney, Agent, or Firm*—Nixon & Vanderhye P.C.

(57) ABSTRACT

A resin composition for a sliding member, comprises from 0.1 to less than 1.0% by weight of a fatty acid, 0.1 to 2.0% by weight of a metallic soap, 0.1 to 2.0% by weight of a phosphate, 0.3 to 2.0% by weight of a lubricating oil, and a polyester-based elastomer as the balance. A sliding member produced from such resin composition exhibits excellent friction and wear characteristics even at a low sliding speed under a high load.

12 Claims, No Drawings

RESIN COMPOSITION FOR SLIDING MEMBER AND SLIDING MEMBER USING THE SAME

BACKGROUND OF THE INVENTION

The present invention relates to a resin composition for a sliding member and a sliding member produced from the resin composition, and more particularly, to a resin composition for a sliding member which exhibits excellent friction and wear characteristics even at a low sliding speed under a high load, and a sliding member produced from the resin composition.

Conventionally, there have been proposed various synthetic resin sliding members made of a thermoplastic synthetic resin blended with a lubricating oil, which are further enhanced in self-lubricating property and wear resistance and capable of withstanding a long-time use without applying oils thereto.

For example, the inventions of Japanese Patent Publication (KOKOKU) Nos. 46-5321(1971), 46-42217(1971) and 47-42615(1972) relate to a process for the production of a sliding member made of a polyacetal resin containing a lubricating oil, and those KOKOKUs describe that a polyacetal resin is impregnated with a lubricating oil in order to reduce its friction coefficient and remarkably enhance its wear resistance. However, these conventional processes have technical problems from the standpoint of production engineering, and further suffer from problems such as failure to lower its friction coefficient (static friction coefficient) upon initiation of sliding operation, deterioration in friction and wear characteristics at a sliding speed higher than 25 m/minute, rough surface of molded products with the increase in its lubricating oil content, or the like.

To solve the above conventional problems, the techniques described in Japanese Patent Application Laid-Open (KOKAI) No. 62-45662(1987) have been proposed. In this KOKAI, there is described a synthetic resin composition for a sliding member which is prepared by uniformly mixing a thermoplastic synthetic resin with 1 to 10% by weight of a saturated fatty acid, 1 to 20% by weight of a phosphate powder and not more than 2% by weight of a lubricating oil wherein the weight ratio of the lubricating oil to the saturated fatty acid is $1/10$ to $1/2$.

Although the siding member produced from the synthetic resin composition described in Japanese Patent Application Laid-Open (KOKAI) No. 62-45662(1987) can exhibit excellent friction and wear characteristics, it has been further found that in the case where the sliding member is applied to sliding portions such as steering device of automobiles, there arise such a problem that its friction coefficient becomes high and its wear amount becomes large under specific use conditions, for example, at a sliding speed as low as not more than 1 m/minute under a load (surface pressure) as high as more than 50 kgf/cm$^2$. In addition, the sliding portions such as steering device of automobiles are inevitably exposed to vibrations transmitted from outside. Therefore, it has been required that the sliding member itself exhibits a good vibration-absorbing property.

As a result of the present inventor' earnest studies for solving the above problems, it has been found that by blending a polyester-based elastomer exhibiting a good vibration-absorbing property by its rubber elasticity with specific amounts of fatty acid, metallic soap, phosphate and lubricating oil, a sliding member produced from the thus obtained resin composition can exhibit not only excellent friction and wear characteristics even at a low sliding speed under a high load, but also an excellent vibration-absorbing property. The present invention has been attained on the basis of the above finding.

SUMMARY OF THE INVENTION

An object of the present invention is to provide a resin composition for a sliding member capable of exhibiting excellent friction and wear characteristics even at a low sliding speed under a high load.

Another object of the present invention is to provide a sliding member which can exhibit excellent friction and wear characteristics even at a low sliding speed under a high load and an excellent vibration-absorbing property.

To accomplish the aims, in a first aspect of the present invention, there is provided a resin composition for a sliding member comprising from 0.1 to less than 1.0% by weight of a fatty acid, 0.1 to 2.0% by weight of a metallic soap, 0.1 to 2.0% by weight of a phosphate, 0.3 to 2.0% by weight of a lubricating oil, and a polyester-based elastomer as the balance.

In a second aspect of the present invention, there is provided a sliding member produced from the resin composition as defined in the first aspect.

DETAILED DESCRIPTION OF THE INVENTION

The present invention will be described in detail below. First, the polyester-based elastomer as a main component of the resin composition for a sliding member according to the present invention will be explained.

As the polyester-based elastomer, there may be exemplified elastomers comprising polybutylene terephthalates (PBT) as hard segment, and aliphatic polyethers or aliphatic polyesters as soft segment.

The elastomers composed of polybutylene terephthalates (PBT) and the aliphatic polyethers are so-called polyester-polyether type elastomers. Examples of such polyester-polyether type elastomers may include "HYTREL" (tradename, produced by DuPont Co.), "PELPRENE P-TYPE" (tradename, produced by Toyo Boseki Co., Ltd.), or the like.

Also, The elastomers composed of polybutylene terephthalates (PBT) and the aliphatic polyesters are so-called polyester-polyester type elastomers. Examples of such polyester-polyester type elastomers may include "PELPRENE S-TYPE" (tradename, produced by Toyo Boseki Co., Ltd.), or the like.

The fatty acids usable in the present invention are higher fatty acids exhibiting a wax-like or oily state at ordinary temperature and having usually not less than 10 carbon atoms, preferably 10 to 34 carbon atoms. As such higher fatty acids, there may be used either saturated fatty acids having usually not less than 10 carbon atoms, preferably 10 to 34 carbon atoms, or unsaturated fatty acids having usually not less than 12 carbon atoms, preferably 12 to 24 carbon atoms.

As the saturated fatty acids, there may be used normal saturated fatty acids exhibiting a wax-like state at ordinary temperature and having usually not less than 10 carbon atoms. Examples of the normal saturated fatty acids may include capric acid ($C_{10}$), lauric acid ($C_{12}$), myristic acid ($C_{14}$), palmitic acid ($C_{16}$), stearic acid ($C_{18}$), arachic acid ($C_{20}$), behenic acid ($C_{22}$), cerotic acid ($C_{26}$), montanic acid ($C_{28}$), melissic acid ($C_{30}$) or the like.

As the unsaturated fatty acids, there may be used those exhibiting an oily state at ordinary temperature and having usually not less than 12 carbon atoms. Examples of the unsaturated fatty acids may include lauroleic acid ($C_{12}$), myristoleic acid ($C_{14}$), oleic acid ($C_{18}$), linoleic acid ($C_{18}$), gadoleic acid ($C_{20}$) or the like.

The amount of the fatty acid blended may be determined according to amounts of the below-described other components blended. The fatty acid can exhibit an effect of reducing a friction coefficient of the obtained resin composition even when blended in as small an amount as 0.1% by weight. The lower limit of the amount of the fatty acid blended is usually 0.1% by weight, preferably 0.4% by weight, more preferably 0.5% by weight based on the weight of the resin composition. The upper limit of the amount of the fatty acid blended is usually less than 1% by weight, preferably 0.9% by weight, more preferably 0.8% by weight based on the weight of the resin composition. When the amount of the fatty acid blended is not less than 1% by weight, although the effect of reducing the friction coefficient can be exhibited, the obtained resin composition is deteriorated in wear resistance at a low sliding speed under a high load. When the amount of the fatty acid blended is less than 0.1% by weight, the effect of reducing the friction coefficient cannot be exhibited. These fatty acids may be blended and uniformly mixed in the form of powder, granules, butter-like paste or oil, with the above polyester-based elastomer. In the case of solid fatty acids, it is preferred to mix the solid fatty acid with the polyester-based elastomer while stirring and heating to such a temperature capable of melting the solid fatty acid.

The metallic soap used in the present invention may include at least one metallic soap selected from the group consisting of calcium soap, sodium soap, aluminum soap and lithium soap.

The metallic soap exhibits not only the effect of reducing the friction coefficient similarly to the above fatty acid, but also shows such an effect of absorbing or adsorbing and retaining the below-described lubricating oil and preventing the bleed-out of the lubricating oil upon molding. The amount of the metallic soap blended is usually 0.1 to 2.0% by weight, preferably 0.4 to 1.0% by weight based on the weight of the resin composition. When the amount of the metallic soap blended is less than 0.1% by weight, neither the effect of reducing the friction coefficient nor the effect of preventing the bleed-out of the lubricating oil can be exhibited. When the amount of the metallic soap blended is more than 2.0% by weight, the obtained resin composition is deteriorated in heat stability.

As the phosphate used in the present invention, there may be exemplified metal salts such as tertiary phosphates, secondary phosphates, pyrophosphates, phosphites and metaphosphates, or mixtures thereof. Among these phosphates, tertiary phosphates, secondary phosphates and pyrophosphates are preferred. As metals contained in the phosphates, there may be exemplified alkali metals, alkali earth metals and transition metals. Among these metals, alkali metals and alkali earth metals are preferred, and lithium (Li), calcium (Ca), magnesium (Mg) and barium (Ba) are more preferred.

Specific examples of the especially preferred phosphates may include trilithium phosphate ($Li_3PO_4$), dilithium hydrogenphosphate ($Li_2HPO_4$), lithium pyrophosphate ($Li_4P_2O_7$), tricalcium phosphate ($Ca_3(PO_4)_2$), calcium pyrophosphate ($Ca_2P_2O_7$) and calcium hydrogenphosphate ($CaHPO_4 \cdot 2H_2O$)).

The phosphate may be uniformly mixed with the polyester-based elastomer, the fatty acid and the metallic soap. The phosphate has an average particle size of usually not more than 20 $\mu$m, preferably 3 to 10 $\mu$m. Although the phosphate itself does not show a lubricating property, when the phosphate is used together with the fatty acid in a small amount and the below-described lubricating oil, there can be obtained such synergistic effects of stabilizing the friction coefficient and enhancing the wear resistance. The amount of the phosphate blended is usually 0.1 to 2.0% by weight, preferably 0.4 to 1.2% by weight based on the weight of the resin composition. When the amount of the phosphate blended is more than 2.0% by weight, the obtained resin composition is deteriorated in wear resistance. When the amount of the phosphate blended is less than 0.1% by weight, the effect of improving the wear resistance cannot be exhibited.

As the lubricating oil used in the present invention, there may be exemplified mineral oils such as machine oils and engine oils, vegetable oils such as castor oil and jojoba oil, synthetic oils such as ester oils and silicone oils, or the like. The lubricating oil can exhibit a synergistic effect of reducing the friction coefficient when used together with the above metallic soap. The amount of the lubricating oil blended is usually 0.3 to 2.0% by weight, preferably 0.4 to 1.6% by weight based on the weight of the resin composition. When the amount of the lubricating oil blended is less than 0.3% by weight, the effect of reducing the friction coefficient cannot be exhibited. When the amount of the lubricating oil blended is more than 2.0% by weight, the obtained resin composition is deteriorated in a moldability such as a biting property (a property whether the molding material can advance smoothly through a cylinder by rotating screw).

The resin composition prepared by blending specific amounts of the respective components together is injection-molded or extrusion-molded in order to produce a sliding member such as a bearing. The thus obtained sliding member has a smooth and glossy surface, and is free from flow marks and rough surface.

The sliding member of the present invention preferably has a kinetic friction coefficient of 0.14 to 0.18; a static friction coefficient of 0.10 to 0.13; and an wear amount of 5 to 10 $\mu$m when subjected to the following thrust test. That is, in the thrust test, the end face of a cylindrical mating member made of carbon steels for machine structural use (S45C) is pressed against a square plate-shaped molded sliding member, and then the cylindrical mating member is slidingly rotated at a sliding speed of 0.8 m/minute under a load of 100 kgf/cm$^2$ without lubrication for 8 hours.

The resin composition for a sliding member according to the present invention can exhibit excellent friction and wear characteristics even when used at a low sliding speed under a high load. Also, the sliding member produced from the resin composition has a smooth and glossy surface and is free from flow marks and rough surface.

EXAMPLES

The present invention will be described in more detail by reference to the following examples. However, the following examples are only illustrative and not intended to limit the scope of the present invention thereto.

Square plate-shaped molded members obtained in Examples and Comparative Example were tested under the following conditions to determine friction and wear characteristics thereof.

Test Conditions
  Sliding speed: 0.8 m/minute
  Load applied: 100 kgf/cm$^2$
  Lubrication: None
  Mating member: Carbon steels for machine structural use (S45C)
  Testing method: Thrust test in which the end face of the cylindrical mating member was pressed against each square plate-shaped molded member, and then the cylindrical mating member was slidingly rotated.
  Test time: 8 hours

Examples 1 to 4 and Comparative Example 1

A polyester-polyether type elastomer "PELPRENE P-150B" (tradename, produced by Toyo Boseki Co., Ltd.), was used as the polyester-based elastomer, and mixed with stearic acid as the fatty acid, lithium soap as the metallic soap, trilithium phosphate as the phosphate and an engine oil as the lubricating oil so as to prepare a composition as shown in Table 1. The thus prepared composition was stirred and mixed by a high-speed mixer to obtain a molding material. The obtained molding material was injection-molded using a screw-in-line type injection-molding machine, thereby obtaining a square plate-shaped molded member (sliding member) having longitudinal and lateral lengths of 30 mm each and a thickness of 3 mm.

The thus obtained square plate-shaped molded member was subjected to the above thrust test. The results are shown in Table 1.

TABLE 1

|  | Ex. 1 | Ex. 2 | Ex. 3 | Ex. 4 | Com. Ex. 1 |
|---|---|---|---|---|---|
| TPEE | 98 | 97.5 | 97 | 96.1 | 97 |
| Fatty acid (stearic acid) | 0.5 | 0.5 | 0.5 | 0.8 | 1.0 |
| Metallic soap (lithium soap) | 0.5 | 0.5 | 0.5 | 0.8 | — |
| Phosphate (lithium phosphate) | 0.5 | 0.5 | 1.0 | 0.8 | 1.0 |
| Lubricating oil (engine oil) | 0.5 | 1.0 | 1.0 | 1.5 | 1.0 |
| Kinetic friction coefficient | 0.16 | 0.15 | 0.14 | 0.14 | 0.26 |
| Static friction coefficient | 0.12 | 0.12 | 0.11 | 0.10 | 0.17 |
| Wear amount ($\mu$m) | 9 | 9 | 8 | 6 | 16 |

(Note) In the table, the amounts of respective components blended are indicated by "% by weight".

As apparent from the above test results, the sliding members obtained in Examples 1 to 4 exhibited a stable low friction coefficient throughout the test time, and a wear amount as low as 6 to 9 $\mu$m. On the other hand, the sliding member obtained Comparative Example 1 exhibited a high friction coefficient and a large wear amount. Also, no bleed-out was observed on the surface of each sliding member obtained in Examples 1 to 4. On the other hand, it was confirmed that the lubricating oil was bled-out on the surface of the sliding member obtained in Comparative Example 1. This showed that the amount of the lubricating oil contained in the sliding member of Comparative Example 1 was reduced, so that the friction and wear characteristics thereof were deteriorated.

In the sliding members obtained in Examples 1 to 4, the metallic soap contained therein acted for absorbing or adsorbing and retaining the lubricating oil. The synergistic effect by combining the metallic soap with the lubricating oil results in a stable low friction coefficient of each sliding member. Further, it is considered that the bleeding-out of the lubricating oil to the surface of each sliding member was prevented by the effect by the metallic soap, i.e., the effect of absorbing or adsorbing and retaining the lubricating oil therein.

What is claimed is:

1. A resin composition for a sliding member, comprising from 0.1 to less than 1.0% by weight of a fatty acid, 0.1 to 2.0% by weight of a metallic soap, 0.1 to 2.0% by weight of a metallic salt of an inorganic phosphoric acid, 0.3 to 2.0% by weight of a lubricating oil, and a polyester-containing elastomer as the balance.

2. A resin composition for a sliding member according to claim 1, wherein the polyester containing elastomer is selected from the group consisting of polyester-polyether elastomers and polyester-polyester elastomers.

3. A resin composition for a sliding member according to claim 1, wherein the fatty acid is at least one compound selected from the group consisting of saturated fatty acids and unsaturated fatty acids.

4. A resin composition for a sliding member according to claim 3, wherein the saturated fatty acids are normal saturated fatty acids having not less than 10 carbon atoms, and the unsaturated fatty acids are unsaturated fatty acids having not less than 12 carbon atoms.

5. A resin composition for a sliding member according to claim 1, wherein the metallic soap is at least one selected from the group consisting of calcium soap, sodium soap, aluminum soap and lithium soap.

6. A resin composition for a sliding member according to claim 1, wherein the metallic salt of an inorganic phosphoric acid is at least one metallic salt selected from the group consisting of tertiary phosphates, secondary phosphates, pyrophosphates, and metaphosphates.

7. A resin composition for a sliding member according to claim 1, wherein the metallic salt of an inorganic phosphoric acid is at least one phosphate selected from the group consisting of trilithium phosphate, lithium hydrogenphosphate, lithium pyrophosphate, tricalcium phosphate, calcium pyrophosphate and calcium hydrogenphosphate.

8. A resin composition for a sliding member according to claim 1, wherein the lubricating oil is at least one selected from the group consisting of mineral oils, vegetable oils and synthetic oils.

9. A resin composition for a sliding member according to claim 1, wherein the content of the fatty acid is 0.1 to 0.9% by weight.

10. A resin composition for a sliding member, comprising 0.5 to 0.8% by weight of a fatty acid, 0.1 to 2.0% by weight of a metallic soap, 0.1 to 2.0% by weight of a metallic salt of an inorganic phosphoric acid, 0.3 to 2.0% by weight of a lubricating oil, and a polyester containing elastomer as the balance.

11. A sliding member produced from a resin composition comprising from 0.1 to less than 1.0% by weight of a fatty acid, 0.1 to 2.0% by weight of a metallic soap, 0.1 to 2.0% by weight of a metallic salt of an inorganic phosphoric acid, 0.3 to 2.0% by weight of a lubricating oil, and a polyester containing elastomer as the balance.

12. A sliding member produced from a resin composition comprising 0.5 to 0.8% by weight of a fatty acid, 0.1 to 2.0% by weight of a metallic soap, 0.1 to 2.0% by weight of a metallic salt of an inorganic phosphoric acid, 0.3 to 2.0% by weight of a lubricating oil, and a polyester containing elastomer as the balance.

* * * * *